(12) United States Patent
Senoo et al.

(10) Patent No.: US 7,105,735 B2
(45) Date of Patent: Sep. 12, 2006

(54) ELECTRONIC MUSICAL INSTRUMENT

(75) Inventors: Tatsuya Senoo, Hamamatsu (JP); Kenji Yamada, Hamamatsu (JP)

(73) Assignee: Roland Corporation, Osaka (JP)

( * ) Notice: Subject to any disclaimer, the term of this patent is extended or adjusted under 35 U.S.C. 154(b) by 112 days.

(21) Appl. No.: 10/757,363

(22) Filed: Jan. 14, 2004

(65) Prior Publication Data

US 2004/0200336 A1    Oct. 14, 2004

(30) Foreign Application Priority Data

Jan. 15, 2003    (JP)    ............................. 2003-007218
Jun. 27, 2003    (JP)    ............................. 2003-185667

(51) Int. Cl.
G10H 7/00    (2006.01)

(52) U.S. Cl. ............................. 84/612; 84/609; 84/636; 84/649

(58) Field of Classification Search .................. 84/612, 84/600–607, 609–611, 634–636, 649–652, 84/666–668
See application file for complete search history.

(56) References Cited

U.S. PATENT DOCUMENTS

| | | | | |
|---|---|---|---|---|
| 5,326,930 A | * | 7/1994 | Hayakawa | ................. 84/636 |
| 6,111,182 A | * | 8/2000 | Takahashi | ................. 84/609 |
| 2004/0144237 A1 | * | 7/2004 | Hoshiai et al. | ............... 84/612 |

FOREIGN PATENT DOCUMENTS

| | | |
|---|---|---|
| JP | 7129170 | 5/1995 |
| JP | 7210160 | 8/1995 |
| JP | 8211864 | 8/1996 |
| JP | 2003255944 | 9/2003 |

OTHER PUBLICATIONS

ACID Pro Music Creation Tool, May 10, 2002, Sonic Foundry, Version 4.0, Ch. 5.*

* cited by examiner

*Primary Examiner*—Marlon T Fletcher
*Assistant Examiner*—Christina Russell
(74) *Attorney, Agent, or Firm*—Foley & Lardner LLP

(57) ABSTRACT

An electronic musical instrument with which, without difficulty to a user, it is possible to reproduce and save and the like the musical tones that the user has performed and to carry this out in units having musically satisfactory breaks. For each count of one beat by a beat counter, the time information for the musical tone data that are stored at that timing is stored in a beat time information table. When a skip-back button is operated during the recording, an address having a musically satisfactory break is acquired by computation based on the time information and the storage address of the operation timing, the time information of said table, and the sampling period. Therefore, even in those cases where optimization processing of the memory has been done during the recording, there is no need to update the storage address at that time. In addition, it is possible to carry out the reproduction and saving of beat units having musically satisfactory breaks by carrying out the reproduction and the saving at the storage address units that have been acquired.

48 Claims, 8 Drawing Sheets

Beat Address Table
30

| Number | Address |
|---|---|
| 0 | 1200000 |
| 1 | 1222050 |
| 2 | 1244100 |
| 3 | 1266150 |
| ⋮ | ⋮ |
| MB | ･･････ |

Beat Time Information Table
300

| Number | Absolute Time |
|---|---|
| 0 | 00:12:26.124 |
| 1 | 00:12:26.624 |
| 2 | 00:12:27.124 |
| 3 | 00:12:27.624 |
| ⋮ | ⋮ |
| MB | •••••• |

FIG. 8

ELECTRONIC MUSICAL INSTRUMENT

CROSS-REFERENCE TO RELATED APPLICATIONS

The present invention relates to and claims priority from Japanese Patent Application Nos. 2003-185667, filed Jun. 27, 2003, and 2003-7218, filed Jan. 15, 2003, each of which are incorporated by reference herein in their entireties.

BACKGROUND

1. Field of the Invention

The present invention relates to an electronic musical instrument and, in particular, to an electronic musical instrument with which it is possible for musical tones that a user has performed to be reproduced and saved in units in which the breaks are musically satisfactory.

2. Description of the Prior Art

Electronic musical instruments are known which save or reproduce performance information at a specified address or at a specified time prior to the issuance of an instruction from a user who stores performance information during a specified period of time. (See Japanese Unexamined Patent Application Publication (Kokai) Number Hei 6-348260, the "'260 application"). In addition, electronic musical instruments are also known that are furnished with an automatic performance capability with which the musical tones that have been stored in advance are generated and automatically performed in conformance with the tempo that has been set by the user. In those cases where the user saves or reproduces the musical tones that have been performed or saves or reproduces the performance information, it is preferable that the saving or reproduction be started and ended in units in which the breaks are musically satisfactory such as units of beats or bars.

However, with the electronic musical instrument cited in the '260 application, since the starting or ending of the saving or reproduction is not done in units in which the breaks are musically satisfactory, the user must carry out the adjustment of the relevant start position or end position him or herself.

SUMMARY

The present invention solves the problem discussed above and has as its object an electronic musical instrument with which it is possible to carry out the reproduction or saving and the like of the musical tones that the user has performed in units in which the breaks are musically satisfactory.

Embodiments of the electronic musical instrument include tempo setting means for setting a tempo; input means for inputting musical tones; musical tone storage means for storing sequentially at a specified sampling period the musical tones that have been input by the input means; time information storage means for storing in conformance with a timing that corresponds to the tempo that has been set by the tempo setting means time information for the musical tones that have been stored in the musical tone storage means; and readout means for readout of the musical tones stored in the musical tone storage means based on the time information stored in the time information storage means.

According to embodiments of the electronic musical instrument, when the musical tones are input by the input means, the musical tones that have been input are stored sequentially to the musical tone storage means at a specified sampling period. The time information for the amplitude value of the musical tone is stored in the time information storage means in conformance with the timing that corresponds to the tempo that has been set by the tempo setting means. The readout start means starts the readout of the musical tones that have been stored in the musical tone storage means based on the time information that is stored in the time information storage means.

According to embodiments of the electronic musical instrument the readout start means may include storage address acquisition means for acquiring a storage address that corresponds to the time information of the musical tones based on the time information stored in the time information storage means and the sampling period. The readout of the musical tones that have been stored in the musical tone storage means may be started based on the storage address acquired by the storage address acquisition means.

The electronic musical instrument may further include instruction means for instructing acquisition of the storage address by the storage address acquisition means, wherein the storage address acquisition means acquires the storage address that corresponds to the time information for the musical tones when the instruction means instructs acquisition of the storage address based on instruction time information acquired in conformance with a timing of the instruction, the storage address that corresponds to the instruction time information, the time information stored in the time information storage means, and the sampling period.

The electronic musical instrument may further include a saving means for saving, in units based on the storage address acquired by the storage address acquisition means, the musical tones that are stored in the musical tone storage means.

An electronic musical instrument according to embodiments of the present invention may include tempo setting means for setting a tempo; input means for inputting musical tones; musical tone storage means for sequentially storing at a specified sampling period the musical tones that have been input by the input means; address storage means for storing, in conformance with a timing that corresponds to the tempo that has been set by the tempo setting means, the storage address of the musical tone that is stored in the musical tone storage means; and readout start means for readout of the musical tones stored in the musical tone storage means based on the address stored in the address storage means.

According to embodiments of the present invention, when the musical tones are input by the input means, the musical tones that have been input may be stored sequentially to the musical tone storage means at a specified sampling period. The storage address of the musical tones may be stored in the address storage means in conformance with the timing that corresponds to the tempo that has been set by the tempo setting means and the readout start means may start the readout of the musical tones that are stored in the musical tone storage means based on the address that is stored in the address storage means.

The electronic musical instrument may further include saving means for saving, in units based on the storage address stored in the address storage means, the musical tones stored in the musical tone storage means.

The electronic musical instrument may further include waveform display means for displaying waveforms of the musical tones input by the previously mentioned input means; and timing display for displaying, at a position that corresponds to the timing that conforms to the tempo that has been set in the tempo setting means, the waveforms of the musical tones displayed by the waveform display means.

According to embodiments of the electronic musical instrument, the timing that corresponds to the tempo that has been set by the tempo setting means may be a beat or a bar.

The electronic musical instrument may further include reporting means for reporting the timing that corresponds to the tempo that has been set by the tempo setting means. The reporting means may read performance data and automatically perform in conformance with the tempo that is set by the tempo setting means.

According to embodiments of the electronic musical instrument of the present invention, the time information or the storage address for the musical tones that have been input from the input means and stored in the musical tone storage means are stored in the time information storage means or the address storage means, respectively, in conformance with the timing that corresponds to the tempo that has been set. Therefore, it is possible to read out the musical tones that have been stored in units for which the break is musically satisfactory (in particular, a beat or a bar) by starting the readout of the musical tones based on the time information that is stored in the time information storage means or the address that is stored in the address storage means. Accordingly, there is the advantageous result that it is possible to carry out the reproduction or saving in a unit for which the break is musically satisfactory without difficulty to the user by carrying out the reproduction or saving of the musical tone based on the readout.

In addition, according to embodiments of the electronic musical instrument of the present invention, since, in the saving means, the saving of the musical tones that have been stored in the musical tone storage means is done in a unit that is based on the time information that is stored in the time information storage means or the address that is stored in the address storage means, there is the advantageous result that musical tones can be saved in units for which the breaks are musically satisfactory (in particular, a beat or a bar). Also, a reproduction means with which the musical tones that are stored in the relevant musical tone storage means are reproduced in a unit based on the time information in the relevant time information storage means, or the address that is stored in the previously mentioned address storage means may be provided instead of the saving means or together with the saving means.

Furthermore, according to embodiments of the electronic musical instrument of the present invention, the storage address is acquired based on the time information that is stored by the time information storage means. For example, the storage address is acquired by means of a calculation based on the timing information, the instruction time information that corresponds to the instruction timing from the instruction means (such as an operator and the like), and the storage address that corresponds to the instruction time information. Therefore, even in those cases where there has been a shift of the storage address caused by memory optimization processing and the like during the storage (during the recording), there is no need to update the storage address at those times. Accordingly, there is the advantageous result that processing in the CPU during recording processing, which is rigorous, becomes convenient and it is possible to maintain stable operation.

In addition, according to embodiments of the electronic musical instrument of the present invention, the timing display means provides a display for the waveform of the input musical tone that is displayed in the waveform display means under a specified condition (for example, grid lines of various thicknesses) at a position that corresponds to the timing that conforms to the tempo that has been set by the tempo setting means. Therefore, a position that is a musically satisfactory break for the musical tones (for example, a position that corresponds to a beat or a bar break) becomes easy to recognize visually. Accordingly, since it is easy to visually recognize the timing for the break, there is the advantageous result that a start point (start address) and an end point (end address) that are set for the reproduction and saving units can be set optimally. In addition, if it is set up such that the start position for the readout can be changed manually after the end of the recording (the storage), it is possible to optimize the position of the readout break.

Furthermore, according to embodiments of the electronic musical instrument of the present invention, since the reporting means reports the timing that corresponds to the tempo that has been set by the tempo setting means, there is the advantageous result that a musical break is reported to the user and it is possible to facilitate a performance that matches the timing of the break. Also, with regard to the reporting means, an LED that lights at the relevant timing and an automatic performance means with which the performance is carried out at the relevant timing can be given as examples.

According to embodiments of the electronic musical instrument of the present invention, since the reporting means reads out the performance data that are stored and carries out an automatic performance in conformance with the tempo that is set, there is the advantageous result that, due to the fact that user performs in conformance with the relevant automatic performance, it is possible for the storage to the musical tone storage means to be done at a timing for which the break in the performance of the user is musically satisfactory.

BRIEF DESCRIPTION OF THE DRAWINGS

A detailed description of embodiments of the invention will be made with reference to the accompanying drawings, wherein like numerals designate corresponding parts in the several figures.

FIG. 8 is an outline structural drawing of the beat time information table.

DESCRIPTION OF PREFERRED EMBODIMENTS

In the following description of preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the preferred embodiments of the present invention.

Figure 1:
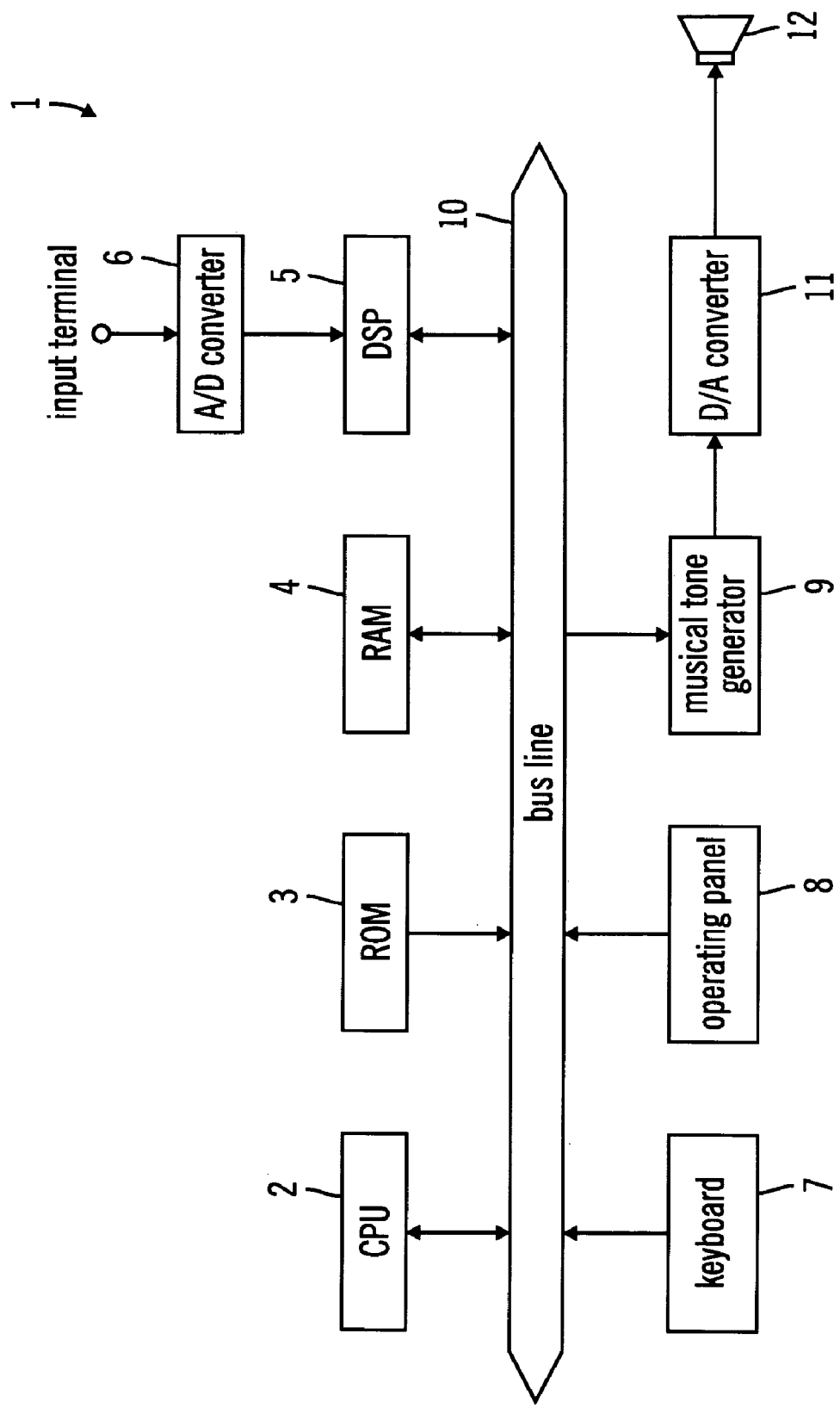
FIG. 1 is a block drawing that shows the electrical configuration of the electronic musical instrument that is a first preferred embodiment of the present invention.

FIG. 1 is a block drawing that shows the electrical configuration of the electronic musical instrument 1 which is one preferred embodiment of the present invention. The electronic musical instrument 1 has a structure that is furnished primarily with the CPU 2, the ROM 3, the RAM 4, the DSP 5, the keyboard 7, the operating panel 8, and the musical tone generator 9; and these are mutually connected by the bus line 10. The CPU 2 is a functional device that is the main executer of the control programs. The various types of control programs that are executed by the CPU 2 as well as the fixed value data that are referred to at the time that the control programs are executed are stored in the ROM 3. The RAM 4 is a rewriteable memory for the temporary storage of the various kinds of data and the working memory and the like for the execution of the control programs that are stored in the ROM 3 and the like.

The DSP 5 is a functional device (a digital signal processor) for the production of the musical tone data of a digital signal and together with the input terminal and the A/D converter 6 comprises an input interface for the performance information that is input from musical tones that have been performed by the user and other performance devices. In other words, the analog signal musical tones that have been input through the input terminal are first converted into digital signal musical tone data by the A/D converter 6 and then the musical tone data are converted in conformance with the settings state of the electronic musical instrument 1 by the DSP 5. The DSP 5 executes the musical tone data processing, which will be discussed later (FIG. 7), at a period (a sampling period) of 44.1 kHz. The musical tone data that are converted are stored to the RAM 4 and also output to the musical tone generator 9 and reproduced. Alternatively, the musical tone data that have been stored to the RAM 4 are read out and output to the musical tone generator 9 and reproduced.

The keyboard 7 is furnished with a plurality of keys and carries out the start, the stop, and the like of the generation of the musical tones that have been assigned to each of the keys. The operating panel 8 is a device for carrying out each of the various settings and operations and, together with this, displaying the setting and operating condition of the electronic musical instrument 1 and is furnished with the various kinds of switches 80 through 89 as well as the display device 90 and the LED 91. The operating panel 8 will be discussed in detail later while referring to FIG. 2.

The musical tone generator 9 is a device with which the musical tone data that are based on and correspond to automatic performance processing and the pressing or the releasing operation of the keys of the keyboard 7 are read out and output or with which the musical tone data that have been input from the input terminal and produced by the DSP 5 are output. The D/A converter 11 is connected to the musical tone generator 9 and the speaker 12, with which the analog signal musical tones are emitted and output, is connected to the D/A converter 11. Therefore, the digital signal musical tone data that have been output from the musical tone generator 9 are emitted and output from the speaker 12 after being converted into analog signal musical tones by the D/A converter 11.

Figure 2:
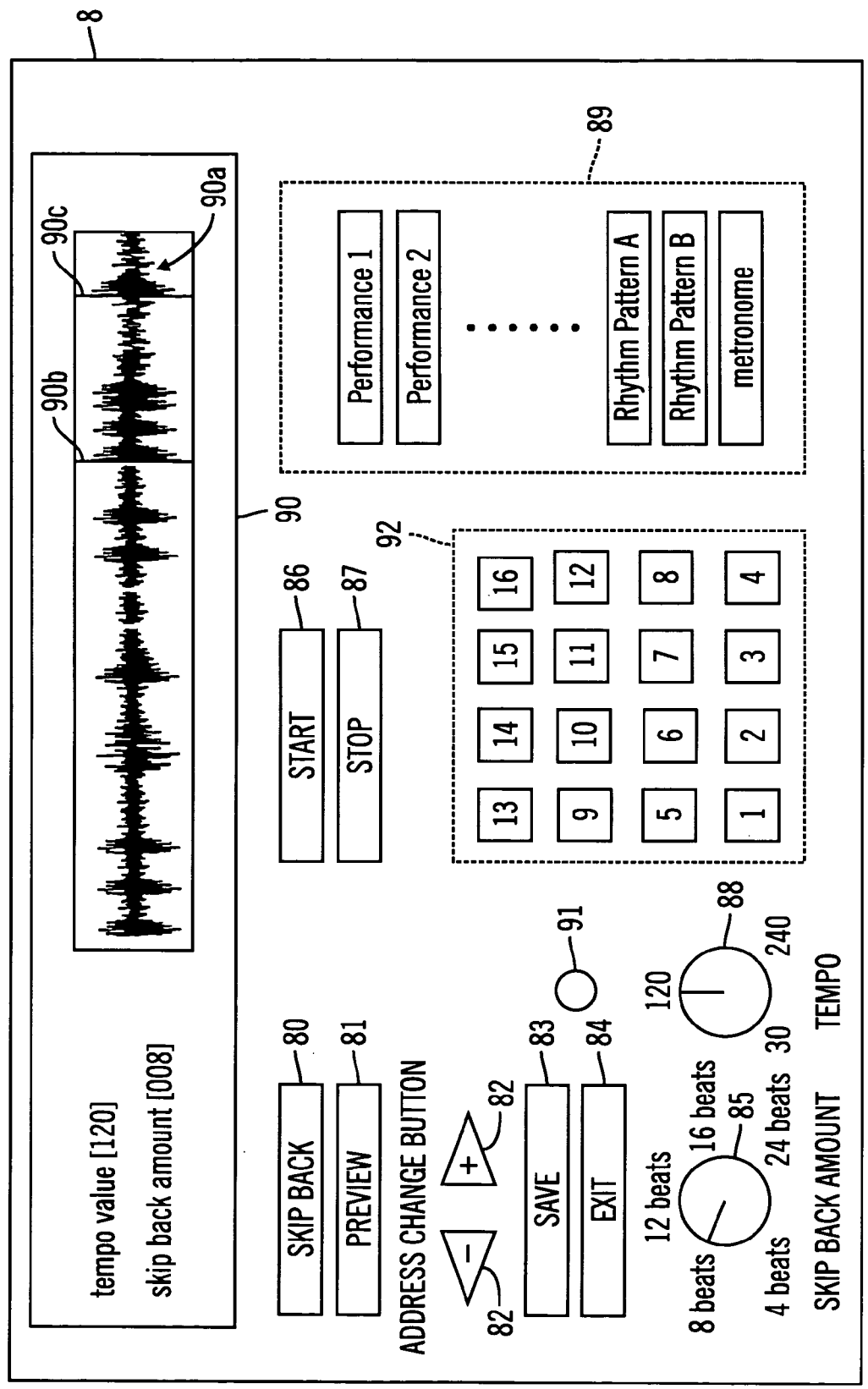
FIG. 2 is a front elevation drawing of the operating panel of the electronic musical instrument.

FIG. 2 is a frontal elevation drawing of the operating panel 8 of the electronic musical instrument 1. The operating panel 8 is provided with the skip-back button 80, the preview button 81, the address change button 82, the save button 83, the exit button 84, the skip-back amount knob 85, the start button 86, the stop button 87, the tempo knob 88, the performance selection button 89, the display device 90, the LED 91, and the pads 92 comprising a plurality of pads.

The skip-back button 80 is a button for the instruction of the start of the skip-back operation that carries out the reproduction and saving of the musical tone data that have been stored to the ring buffer in the RAM 4. When the skip-back button 80 is operated, the recording mode is stopped and together with this, the musical tone data that have been stored are displayed as waveforms on the display device 90. The ring buffer will be discussed later.

Figure 3:
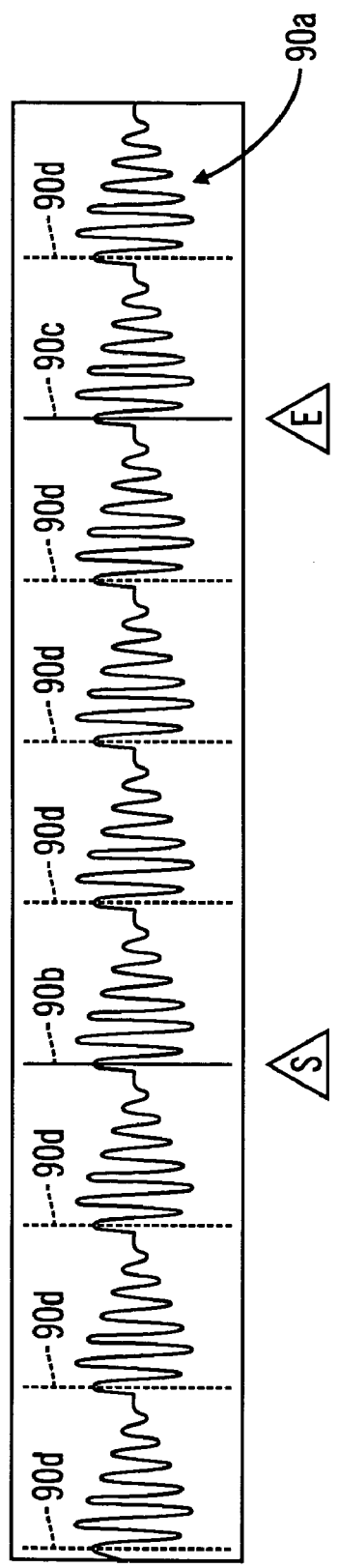
FIG. 3 is a drawing that schematically shows the waveform display portion that is displayed on the display device of the operating panel.

FIG. 3 is a drawing that shows schematically the waveform display section that is displayed on the display device 90 of the operating panel 8 and together with the waveforms (the musical tone data) 90a that have been recorded (stored), the grid line (the break line) 90d that indicates the position that corresponds to the beat, the start point cursor 90b, and the end point cursor 90c are displayed. Here, the start point cursor 90b is a cursor that indicates the reproduction start position (the start address) of the waveform (the musical tone data) 90a. The end point cursor 90c is a cursor that indicates the reproduction end position (the end address) of the waveform 90a.

The preview button 81 is a button for the instruction of the reproduction of the musical tone data that have been stored to the ring buffer and, by means of the operation of the preview button 81, the musical tone data are reproduced from the start point that is indicated by the start point cursor 90b on the display device 90 to the end point that is indicated by the end point cursor 90c. The address change button 82 is a button for the instruction of a change in the position of the start point (the start address) and the end point (the end address) and is provided with a + button that changes both addresses in the forward direction and a − button that changes the addresses in the backward direction. The start point (the start address) and the end point (the end address) are synchronized and their addresses are changed by means of the operation of the address change button 82. In other words, under conditions in which the interval between the start point and the end point is maintained fixed, both points are changed in the forward direction or the backward direction. This kind of change of address that is based on the operation of the address change button 82 is configured in this preferred embodiment such that the change is to the address of the beat unit. However, the configuration may be such that the address change can be for any units desired in conformance with the mode. A change in the interval between the start point (the start address) and the end point (the end address) is carried out by means of the skip-back amount knob 85.

Also, in this preferred embodiment, the configuration is such that the start point and the end point are synchronized and their addresses are changed. However, the configuration may be such that the start point and the end point each has an address change button provided; and the respective addresses can each be changed independently. In this case, the amount that corresponds to the interval between the start point (start address) and the end point (end address) that have each been changed becomes the skip-back amount.

The save button 83 is a button for the instruction of the saving of the musical tone data between the start address and the end address from among the musical tone data that have been stored to the ring buffer to a different region than the ring buffer. By means of the operation of the save button 83, the saving of the relevant musical tone data and a restoration to the recording mode that was terminated by the operation of the skip-back button 80 are carried out. The exit button 84 is a button for the instruction of the ending of the skip-back action and, by means of the operation of the exit button 84, the system is restored to the recording mode that was terminated by the operation of the skip-back button 80.

The start button 86 is a button for the instruction of the start of an automatic performance, and the stop button 87 is a button for the instruction of the stopping of the automatic performance. The tempo knob 88 is a knob for setting the tempo value at the time of an automatic performance and the LED 91 lights at the on-the-beat timing that is determined in conformance with the tempo value that has been set by the tempo knob 88. Therefore, it is possible for a report of the on-the-beat timing to be made to the user of the electronic musical instrument 1 by the lighting of the LED 91. The performance selection button 89 is a button for selecting the performance contents for an automatic performance. In the electronic musical instrument 1, not only can ordinary performance patterns be prepared as the contents of an automatic performance but a rhythm pattern or a metronome can also be prepared. The display device 90 is a unit for the display of the operating state of the electronic musical instrument 1 and, specifically, the device displays the tempo value that has been set by the tempo knob 88, the skip-back amount that has been set by the skip-back knob 85, the waveforms of the musical tone data that have been stored in the ring buffer of the RAM 4, and the start address and stop address.

The pads 92 comprise the plurality of pads (the performance operators) to which the musical tone data that have been recorded are respectively assigned. The pads to which the assignments have been made for the musical tone data reproduce the musical tone data that have been assigned to that pad by an operation (for example, pressing and striking).

Next, an explanation will be given regarding each of the processes that are executed by the CPU 2 and the DSP 5 while referring to the flowcharts of FIG. 5 through FIG. 7. First, before explaining these processes, an explanation will be given of the structure of the RAM 4 and of the flags and the like that are used by each of the processes.

The ring buffer is memory to which the amplitude values (PCM) for the musical tones that are performed by the user and input from the input terminal and have been sampled are sequentially written and is provided in the RAM 4. The writing and the reproduction are carried out by the DSP 5. The writing of the musical tone data to the ring buffer is carried out sequentially from the lead address of the ring buffer and, when the writing has reached the last address, the writing returns to the lead address of the ring buffer and continues to write again from the lead address. Incidentally, the ring buffer of the electronic musical instrument 1 of this preferred embodiment possesses enough capacity to store the musical tone data at the lowest tempo that can be set by the tempo knob 88 and the largest skip-back amount (24 beats in this preferred embodiment) that can be set by the skip-back amount knob 85.

The musical tone data processing flag is a flag that indicates the current processing contents and takes a value of "0 to 2." The musical tone data processing flag value of "0" indicates that the musical tone data are being stored (the recording mode), and "1" indicates the fact that the musical tone data are being reproduced. A value of "2" indicates the fact that the musical tone data are neither being stored nor being reproduced. The musical tone data processing flag is referred to in the processing that is shown in the flowcharts of FIG. 5 and FIG. 7 which will be discussed later. In other words, the flag is referred to by the CPU 2 and the DSP 5.

Figure 4:
FIG. 4 is an outline structural drawing if the beat address table.

The counter is a unit with which the beat units are counted. In the automatic performance processing of FIG. 6, in those cases where the value of the beat counter is "0," one count at a time is added; and when the value after the addition exceeds the maximum value (MB), the counter returns once more to "0." In other words, the counter is updated in the range of "0 to the maximum value (MB)." The counter value corresponds to the table number of the beat address table 30 that is shown in FIG. 4. The beat address table 30 of FIG. 4 is an address table in which each on-the-beat address of the musical tone data that are stored in the ring buffer is stored. In the electronic musical instrument 1 of this preferred embodiment, since the skip-back amount that can be set using the skip-back amount knob 85 is a maximum of 24 beats, the maximum value of the beat address table 30 (MB) is set to a value that is sufficiently larger than 24. In addition, the save counter saves the value of the counter when the recording mode is stopped by the operation of the skip-back button 80 and the start address and stop address are derived based on the value of the save counter.

The skip-back amount indicates the interval between the start address and the stop address in beat units and is set by means of the skip-back amount knob 85. The maximum value is 24 beats. The skip-back amount is referred to in the main processing of FIG. 5. The address change amount indicates the amount of the change in the address that is set by the address change button 82 in beat units and is referred to in the main processing of FIG. 5.

Figure 6:
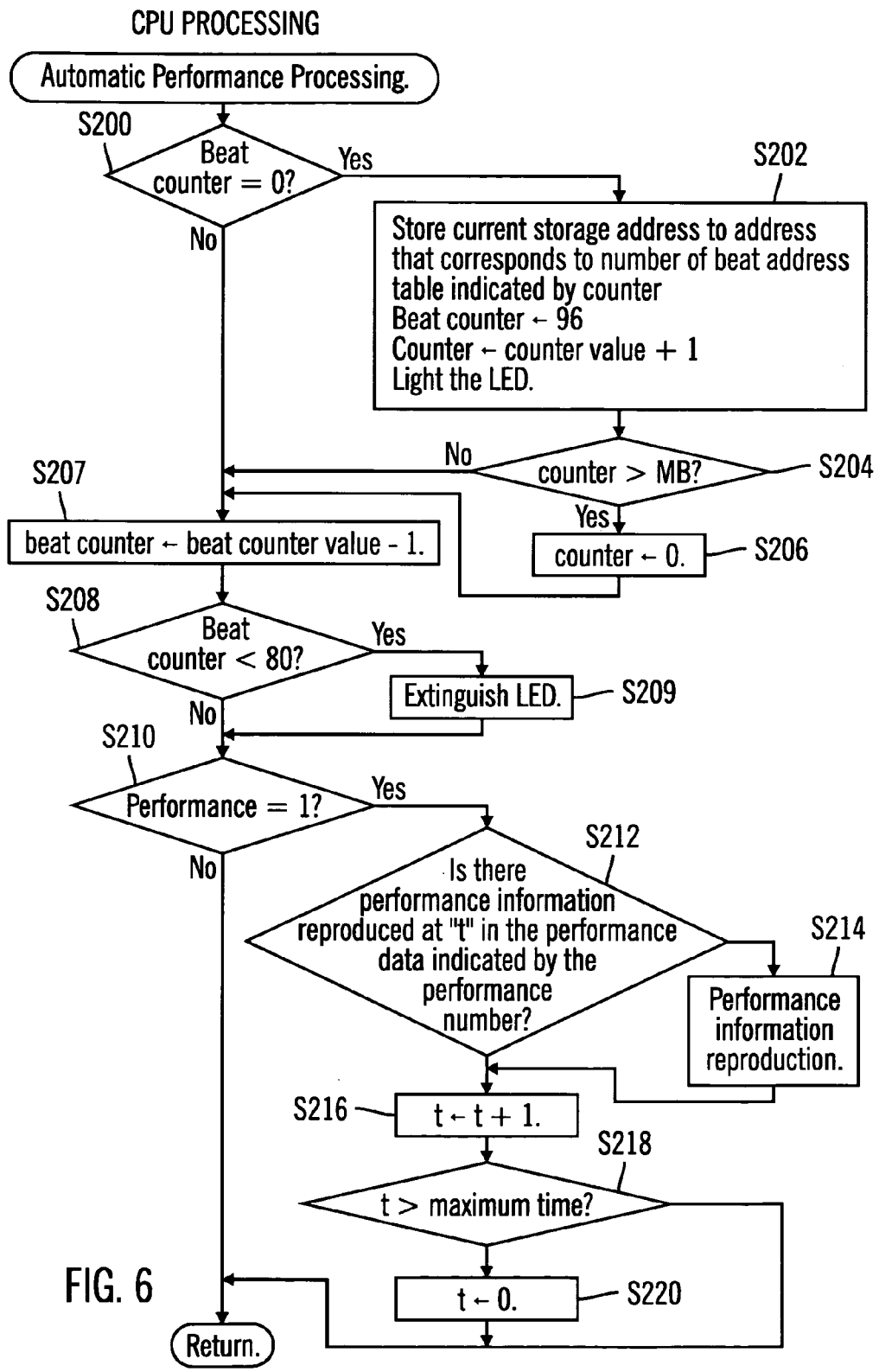
FIG. 6 is a flowchart of the automatic performance processing that is repeatedly executed at the tick period by the interrupt processing of the CPU.
Figure 7:
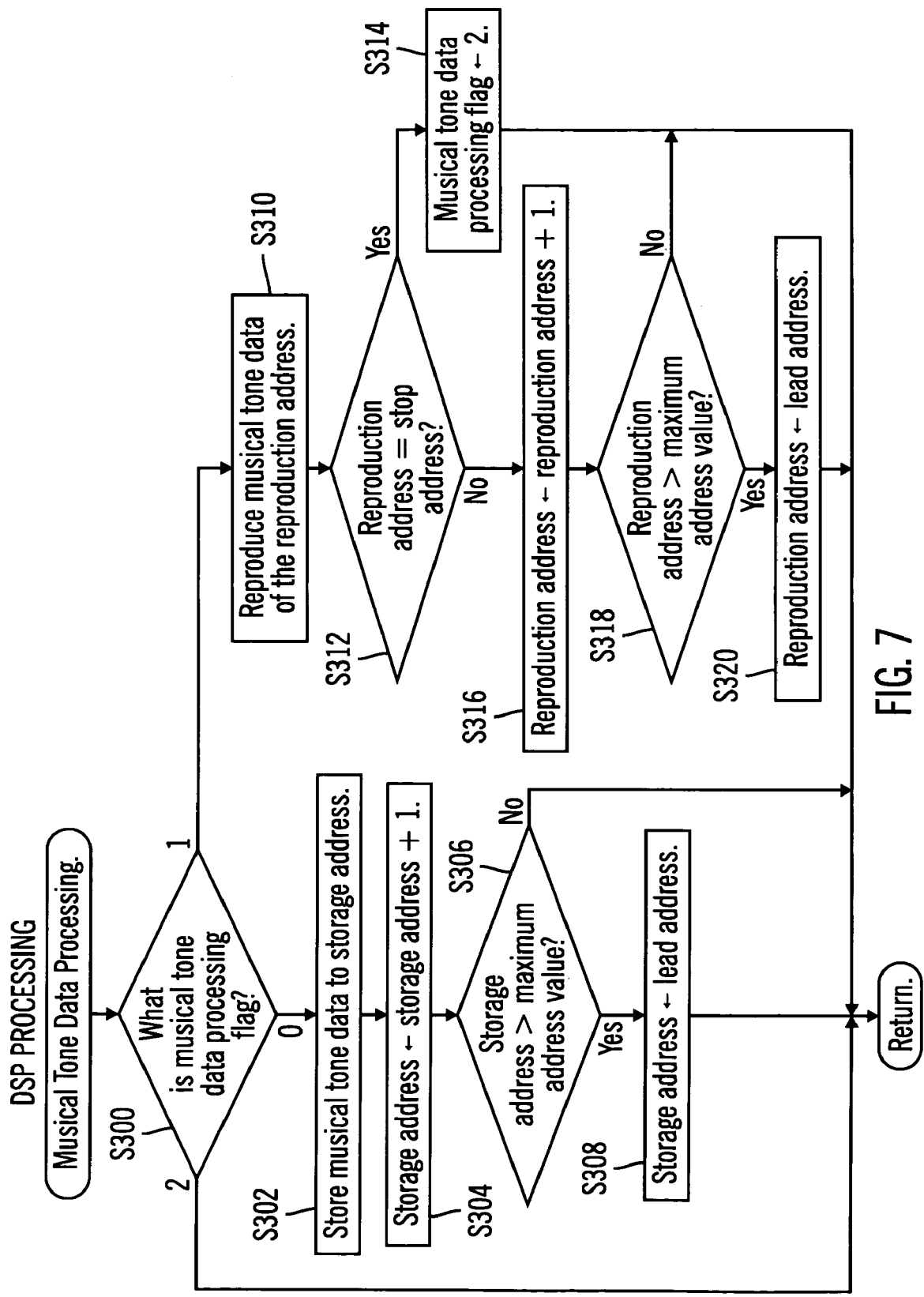
FIG. 7 is a flowchart of the musical tone data processing that is repeatedly executed at the sampling period of 44.1 kHz by the DSP.

The storage address indicates the address of the ring buffer in which the musical tone data are stored and, in accordance with the musical tone data of FIG. 7, is updated by the interval from the lead address to the end address of the ring buffer. The reproduction address indicates the address of the ring buffer in which the musical tone data are reproduced and, in the same manner as the storage address, is updated by the interval from the lead address to the end address of the ring buffer. When the start address is set at the time of the reproduction of the musical tone data that have been stored and the reproduction address is updated up to the stop address, the reproduction processing stops. The performance flag is a flag that indicates whether or not it is in the midst of an automatic performance and when the flag is "1," it indicates it is during a performance; whereas, when the flag is "0," it indicates that the performance is halted. The performance flag is set or reset in the main processing of FIG. 5 and is referred to in the automatic performance processing of FIG. 6.

The variable t is a variable that indicates the performance time and its units are ticks. Here, a tick is the time interval in which one beat has been divided into 96 parts and the number of beats per minute is dependent on the tempo. The beat counter is a counter for counting one beat and 1 is subtracted for each tick. Therefore, since the maximum value of the beat counter is "96," the beat counter is updated one count in the subtractive direction in a range of "0 to 96." In addition, the timing at which the value of the beat counter becomes "0" is made the on-the-beat timing, and the automatic performance is started based on the value of the beat counter having become "0."

Figure 5:
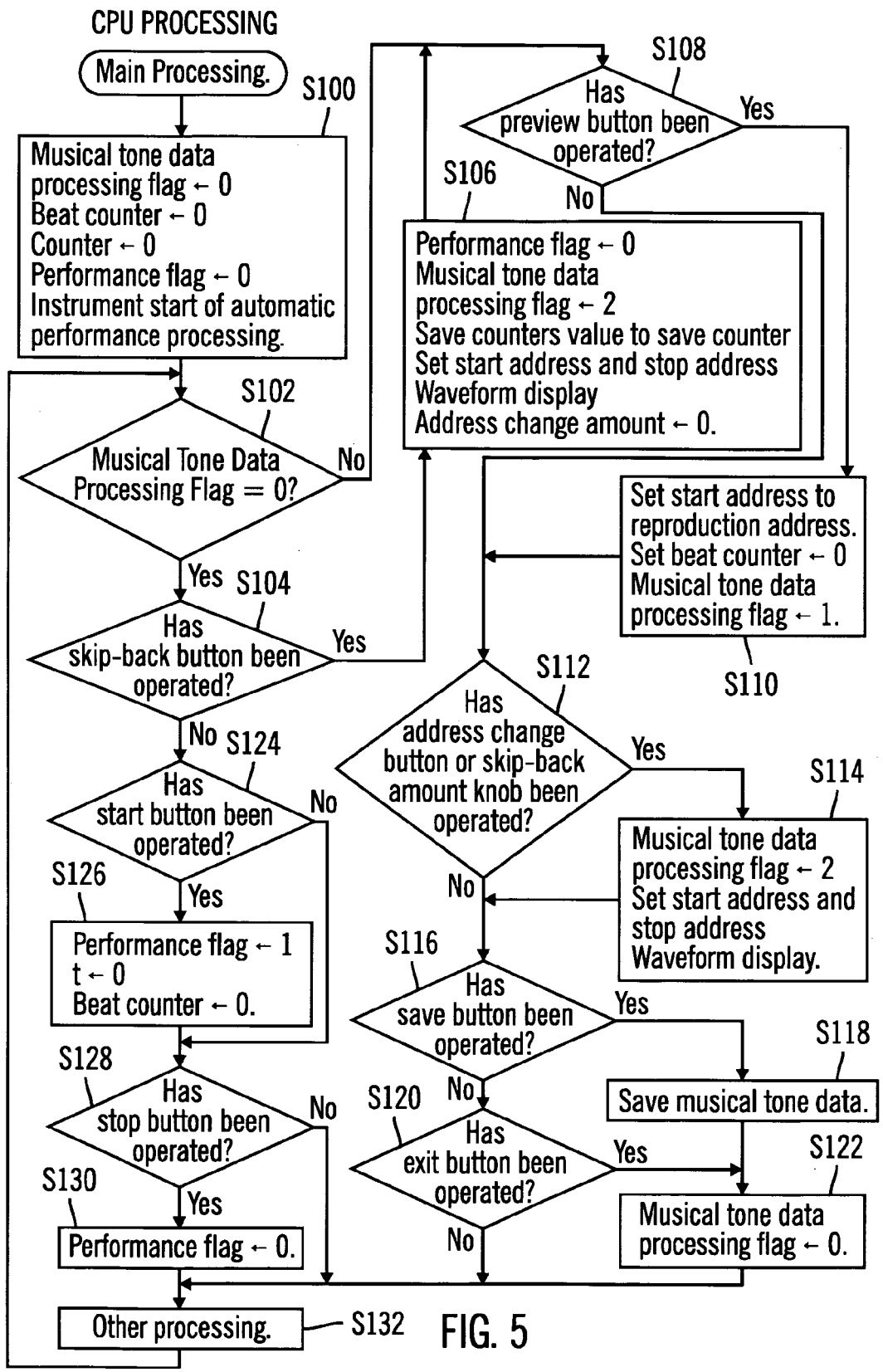
FIG. 5 is a flowchart of the main processing that is executed by the CPU.

FIG. 5 is a flowchart of the main processing that is executed by the CPU 2. The main processing is usually executed after the power to the electronic musical instrument 1 is turned on until it is turned off, except during the execution of the interrupt processing.

In the main processing, first, each of the various flags and memories is initialized (S100). In particular, a "0" is written to the musical tone data processing flag, the recording mode for the musical tone data is set, and an instruction is issued to the DSP 5 to begin recording. In addition, together with writing a "0" to both the beat counter and the counter, the performance flag is made "0" and the automatic performance is set as being halted. Also, an instruction is issued to start the automatic performance processing, which is interrupt processing. At this time, since the launch interval for the automatic performance processing matches the tick cycle, the tempo value, which is the setting value of the tempo knob 88, is read and the launch interval for the automatic performance processing is set. By this means, the timer interrupt processing (the automatic performance processing of FIG. 6) is started at the tick cycle. Also, at this point in time, the beats are counted by the counting of the ticks, and the LED is lit at the beat timing, but the automatic performance is not carried out. The automatic performance is started when the operation of the start button is detected in S124. In other words, in this preferred embodiment, the recording is started together with the turning on of the power and together with the beats that conform to the tempo that has been set being stepped off.

Next, whether or not the musical tone data processing flag is "0" is ascertained (S102); and, if the flag is "0" (S102: yes), since the musical tone data are being stored (the recording mode), the processing proceeds to S104 in the relevant case and whether or not there has been an operation of the skip-back button 80 is ascertained (S104). If there has been an operation of the skip-back button (S104: yes), the recording mode stops. Therefore, in the relevant case, the performance flag is made "0," and the automatic performance is halted; and the musical tone data processing flag is made "2," and the storage and reproduction of the musical tone data are halted. In addition, the counter value is saved to the save counter, the start address and the stop address are set based on the value of the save counter, the address change amount having been made "0," a waveform display appears on the display device 90 together with the start address and the stop address for the musical tone data that are stored in the ring buffer (S106), and the processing proceeds to S108.

Here, the address that is stored in the beat address table 30 that corresponds to the variable i is set to the start address. The variable i is derived by:

{the save counter value}−1 −{the skip-back amount}.

However, it should be noted that, in those cases where the variable i that has been derived is negative, the variable i is made the value of:

{the variable i}+MB.

This is because the beat address table 30 is a table in which each on-the-beat address for the musical tone data that have been stored in the ring buffer is stored. In addition, the address of:

{the address that is stored in the beat address table 30 that corresponds to the variable i}−1 is set to the stop address. In this case, the variable i is:

{the save counter value}−1.

However, it should be noted that in those cases where variable i equals 0, the variable i is made the MB. By means of the above, the final address of the beat that is the one prior to the time of operation of the skip-back button 80 is set as the stop address, and the start address is set on the beat prior to a portion that is the amount of the skip-back from the stop address.

On the other hand, in the processing of S102, if the musical tone data processing flag is not "0" (S102: no), in other words, in those cases where the musical tone data processing flag is "1 or 2," the processing proceeds to S108.

In the processing of S108, the operation of the preview button 81 is ascertained (S108). If the preview button 81 has been operated (S108: yes), since this instructs the reproduction of the musical tone data that have been stored to the ring buffer, the start address is set to the reproduction address, the value of the beat counter is made "0," and, in addition, the musical tone data processing flag is made "1," and the DSP 5 is instructed to start the reproduction of the musical tone data (S110) By this means, the musical tone data are reproduced from the start address, which has been set to the reproduction address, to the stop address by the musical tone data processing of FIG. 7. In addition, since the value of the beat counter is made "0" at the time of starting the reproduction, it is possible to synchronize the lighting timing of the LED 91 with the musical tone data that are reproduced by means of the automatic performance processing of FIG. 6.

In the processing of S112, the operation of the address change button 82 or the skip-back amount knob 85 is ascertained (S112). If either of the buttons 82 or 85 have been operated (S112: yes), first the musical tone data processing flag is made "2" and the reproduction of the musical tone data is halted. Then, the start address and the end address are updated based on the address change amount that has been updated if the address change button 82 is the one that has been operated; or, on the other hand, with the address change amount as it is if the skip-back amount knob 85 is the one that has been operated and a waveform display appears on the display device 90 together with the start address and the stop address for the musical tone data that are stored in the ring buffer (S114).

Here, the address change amount after the change is arrived at by:

{the address change amount}+{the value indicated by the address change button 82 (in other words, "+1" or "−1")}.

If this is in a range where:

{24 (which is the maximum skip-back amount)+1−MB}<{the address change amount after the change}≦0, the address change amount is updated as the new address change amount and, if this is outside this range, the operation of the address change button 82 is ignored.

The address that is stored in the beat address table 30 that corresponds to the variable i is set to the start address based on the address change amount after the update. The variable i is derived by:

{ the save counter value}−1−{the skip-back amount}+{the address change amount}.

However, it should be noted that, in those cases where the variable i that has been derived is negative, the variable i is made the value of:

{the variable i}+MB.

In addition, the address of:

{the address that is stored in the beat address table 30 that corresponds to the variable i}−1 is set to the stop address. In this case, the variable i is:

{the save counter value}−1+{the address change amount}.

However, it should be noted that in those cases where the variable i is less than or equal to 0, the variable i is made the MB.

In the processing of S116, the operation of the save button 83 is ascertained (S116). If the save button 83 has been operated (S116: yes), the musical tone data from the start address to the end address that have been stored in the ring buffer are saved to a saving region that is different from the ring buffer (S118) and the processing proceeds to S122. In addition, in the processing of S120, the operation of the exit button 84 is ascertained (S120). If the exit button 84 has been operated (S120: yes), the processing proceeds to S122. In the processing of S122, the musical tone data processing flag is made "0" (S122) and the recording mode that was ended by the operation of the skip-back button 80 is returned to. Therefore, after that, the storage of the musical tone data to the ring buffer is started again.

In the processing of S104, if the skip-back button 80 has not been operated (S104: no), the operation of the start button 86 is ascertained (S124). If the start button 86 has been operated (S124: yes), various kinds of settings are carried out in order to start an automatic performance by the electronic musical instrument 1 (S126). Specifically, the performance flag is made "1," and the automatic performance is started; and, together with this, the variable t that indicates the performance time and the beat counter are both set to "0" and initialized. According to embodiments of the present invention, since the automatic performance starts on the beat, the address that is stored in the beat address table 30 becomes an address for which the break in the musical tone data is musically satisfactory. Also, for the automatic performance, a performance of the contents that are selected by the performance selection button 89 is carried out.

In the processing of S128, the operation of the stop button 87 is ascertained (S128) and, if the stop button 87 has been operated (S128: yes), the performance flag is made "0" and the automatic performance by the electronic musical instrument 1 is halted (S130). A timer interrupt is not prohibited at this time. After this, the storage of the operating details of performance selection button 89 and the like are done and, after the execution of the other processing (S132), the processing returns to S102. Following this, each of the processes from S102 through S132 are repeated until the power to the electronic musical instrument 1 is cut off.

FIG. 6 is a flowchart of the automatic performance processing that is executed in the interrupt processing of the CPU 2. The automatic performance processing is started by means of a start instruction of the main processing (S100) and is repeated and executed after that by the tick cycle.

In the automatic performance processing, whether or not the value of the beat counter is "0" is first ascertained (S200) and, if the value is "0" (S200: yes), first the current storage address is stored to the address that corresponds to the number of the beat address table 30 that is indicated by the counter. According to embodiments of the present invention, the address of the ring buffer that stores the musical tone data of the portion on the beat is stored to the beat address table 30 that corresponds to the value of the counter. In addition, the value of the beat counter is made a maximum value of "96," the value of the counter is updated with "+1" and, in addition, the LED 91, which should notify the user of the arrival on the beat, is lit (S202).

If the value of the counter following the update is the MB, which is the maximum value of the counter or less (S204: no), the processing proceeds as it is to S207; whereas, on the other hand, if the MB has been exceeded (S204: yes), the value of the counter is made "0" and, after the initialization (S206), the processing proceeds to S207.

In the processing of S207, subtraction is performed with "−1" applied to the value of the beat counter and if, after the subtraction, the value of the beat counter is less than "80" (S208: yes), the LED 91 that was lit in the processing of S202 is extinguished (S209). After the extinguishing of the LED 91, or in those cases where the value of the beat counter is "80" or greater (S208: no), whether the performance flag is "1" is ascertained (S210) and if the performance flag is not "1" but is "0" (S210; no), the automatic performance processing on this occasion ends.

On the other hand, if the performance flag is "1" (S210: yes), since the system is in the midst of an automatic performance, whether there is performance information that is to be reproduced at the variable t, which is the current time, in the performance data that are being performed is ascertained (S212). If there is performance information that is to be reproduced (S212: yes), the performance information is reproduced (S214). After the reproduction of the performance information or in those cases where there is no performance information that is to be reproduced at the variable t (S212: no), the variable t is updated with "+1" (S216). If the variable t after the update is over the maximum time of the performance data (S218: yes), the variable t is initialized as "0" (S220) and, on the other hand, if the variable is not over (S218: no), the variable t after the update is left as it is and the automatic performance processing on this occasion ends.

FIG. 7 is a flowchart of the musical tone data processing that is repeatedly executed at the sampling period of 44.1 kHz. In the musical tone data processing, first the value of the musical tone data processing flag is ascertained (S300) and, if the flag is "0" (S300: 0), by means of each of the processes of S302 through S308 that follow, the musical tone data that have been sampled from the performance of the user are stored to the address in the ring buffer that the storage address indicates. In other words, the storage processing of the musical tone data to the ring buffer is executed.

In the storage processing, first the musical tone data are stored to the address in the ring buffer that the storage address indicates (S302) and the value of the storage address is updated with "+1" (S304). If the value of the storage address after the update exceeds the maximum address value of the ring buffer (S306: yes), the lead address of the ring buffer is written to the storage address (S308) and the musical tone data processing on this occasion ends. On the other hand, if the value of the storage address after the update does not exceed the maximum address value of the ring buffer (S306: no), the musical tone data processing on this occasion ends as it is.

In the processing of S300, if the value of the musical tone data processing flag is "1" (S300: 1), by means of each of the processes of S310 through S320 that follow, the musical tone data that have been stored in the ring buffer are reproduced once from the start address to the stop address. In other words, the reproduction processing of the musical tone data that have been stored is executed. Also, the reproduction processing is started from the state in which the start address has been set to the reproduction address (S110 of FIG. 5).

In the reproduction processing, first the musical tone data that are stored at the reproduction address are reproduced (S310) and whether the reproduction address matches the stop address is ascertained (S312). If the reproduction address does not match the stop address (S312: no), the reproduction address is updated with "+1" (S316). If the value of the reproduction address after the update exceeds the maximum address value of the ring buffer (S318: yes), the lead address of the ring buffer is written to the reproduction address (S320) and the musical tone data processing on this occasion ends. On the other hand, if the value of the reproduction address after the update does not exceed the maximum address value of the ring buffer (S318: no), the musical tone data processing ends as it is. In addition, in the processing of S312, if the reproduction address matches the stop address (S312: yes), since the reproduction from the start address to the stop address has ended, in the relevant case, the musical tone data processing flag is set to "2," the reproduction mode is ended and the musical tone data processing on this occasion ends.

In addition, in the processing of S300, if the value of the musical tone data processing flag is "2" (S300: 2), since the system is in neither the storage mode (the recording mode) nor the reproduction mode, the musical tone data processing on this occasion ends without executing either the storage processing or the reproduction processing.

As has been explained above, since the electronic musical instrument 1 of this preferred embodiment sets the beat counter, which counts by one beat, to a value of "0," which indicates the start time of the automatic performance on the beat, it is possible to start the automatic performance on the beat. Moreover, since for each time that the beat counter becomes "0," the storage address of the musical tone data that have been stored at that timing is stored to the beat address table 30, it is possible for an address for which the break in the musical tone data is musically satisfactory (an address on the beat) to be stored in the beat address table 30. Therefore, by carrying out the reproduction from the address that is stored in the beat address table 30 or by carrying out the reproduction and saving by address units that are stored in the beat address table 30, it is possible to carry out the reproduction on the beat or to carry out a beat unit reproduction and saving. Therefore, it is possible to carry out the reproduction from a location at which the break is musically satisfactory or to carry out the reproduction and saving in units in which the break is musically satisfactory. In addition, by lighting the LED 91 at a timing that arrives on the beat, it is possible to silently report the timing to the performer of the electronic musical instrument 1.

Next, an explanation will be given regarding a second preferred embodiment of the electronic musical instrument 1 of the present invention while referring to FIG. 8. In the first preferred embodiment described above, each storage address on the beat of the musical tone data is stored in the beat address table 30. Instead of this, in the second preferred embodiment, an absolute time that is measured by a timer that is not shown in the drawing (a time that is measured from the time that the power to the electronic musical instrument 1 is turned on) is acquired for each count of one beat by the beat counter and the absolute time that has been acquired is stored in the beat time information table 300 (FIG. 8). Also, the portions that are identical to those in the previously mentioned first preferred embodiment have been assigned the same keys and their explanation will be omitted.

FIG. 8 shows the beat time information table 300. In the beat time information table 300, the absolute time that is measured for each count of one beat by the counter, i.e., for each time that the beat counter indicates "0," is stored to each table number that corresponds to the value of the beat counter.

Therefore, since by means of the beat time information table 300, an absolute time is stored each time a beat is counted, it is possible to calculate the time that is required to count one beat. Accordingly, based on the time required for one beat and the sampling frequency (or the sampling period), it is possible to obtain the number of samples that have been sampled during the time that one beat has been counted, i.e., the storage address amount that is equivalent to the portion for one beat, by means of a computation. By this means, the beat unit skip-back amount can also be calculated.

In the case of the second preferred embodiment also, in the same manner as in the case of the first preferred embodiment, when the skip-back button 80 is operated during the storage of the musical tone data (in the recording mode), the recording mode ends and, together with this, the processing of S106 of the main processing (FIG. 4) is carried out. Here, in the second preferred embodiment, the start address and the stop address are set based on the absolute time that has been acquired by the operation of the skip-back button 80 and the storage address.

The storage address that corresponds to the absolute time that has been stored in the beat time information table 30 is derived by means of a computation, and the address in which the storage address that has been obtained by the computation has been decreased by "1" is set to the stop address. Here, the storage address that corresponds to the absolute time that has been stored last in the beat time information table 30 is obtained by computation using the time lapse from the absolute time that has been stored last in the beat time information table 30 (the absolute time that is stored for the table number that equals the value of the save counter) to the point in time of the operation of the skip-back button 80, the storage address that corresponds to the time of operation of the skip-back button 80, and the sampling frequency.

The address, in which the address amount that is equivalent to the beat unit skip-back amount that has been set by the operation of the skip-back amount knob 85 is subtracted from the stop address that has been obtained as discussed above, is set to the start address.

As discussed above, due to the fact that the beginning position of each beat in the musical tone data is stored as an absolute time and the storage addresses including the start address and the stop address and the like are acquired by means of the computation based on the absolute times, even in those cases where there has been a shift in the storage address caused by the optimization of the memory and the like, there is no need to update the address table at that time. Accordingly, in particular, during the recording processing in which the CPU 2 processing becomes demanding also, there is no need to update the address table and it is possible to maintain stable operation.

The ring buffer corresponds to a musical tone storage means. Also, two kind of processing correspond to the readout start means. When musical tone data is reproduced, the musical tone data readout processing is the processing in which the start address is set to the reproduction address at the time of the reproduction of the musical tone data (S110) and the processing in which the musical tone data are reproduced from the reproduction address (S310). When musical tone data is saved, the musical tone data readout processing in the musical tone data saving processing is the processing in which the musical tone data are saved from the start address at the time of the saving of the musical tone data (S118).

The processing in which the start address and the stop address are set based on the absolute time that has been acquired by the operation of the skip-back button 80 and the storage address in the processing of S106 of the second preferred embodiment corresponds to a storage address acquisition means.

The musical tone data saving processing in which the musical tone data are stored from the start address to the stop address (S118) corresponds to a saving means.

The processing of S114 in which a waveform display appears on the display device 90 together with the start address and the stop address for the musical tone data that are stored in the ring buffer corresponds to a waveform display means.

An explanation has been given above of the present invention based on preferred embodiments but the present invention is in no way limited to the preferred embodiments described above. Various kinds of improvements and modifications are possible that do not deviate from and are within the scope of the present invention.

For example, in the preferred embodiments described above, the configuration is such that the reproduction or the saving of the musical tone data is carried out in beat units based on the beat position information. However, instead of this it can be configured such that this is carried out in bar units, which are units that are greater than the beat units. In other words, it may be set up such that the reproduction of the musical tone data may be carried out from the start of the bar or may be set up such that reproduction and saving of the musical tone data are carried out in bar units. In those cases where the reproduction and saving of the musical tone data are carried out in bar units, instead of the beat address table 30 or the beat time information table 30 in which the storage addresses that have been acquired in beat units are stored in the preferred embodiments described above, the configuration may be such that a bar address table in which the storage addresses that correspond to each bar break for the musical tone data are stored or a bar time information table in which the absolute times that correspond to each bar break are stored are provided. In addition, in order to store the storage addresses in the bar address table or the bar absolute time table, instead of the beat counter or together with the beat counter, the system may be arranged with a bar counter that counts one bar and together with the automatic performance being started from the value that the bar counter indicates to be the beginning of the bar, acquires the storage address of the musical tone data that is stored at the timing, which is the value that the bar counter indicated is the beginning of the bar.

Or, the configuration may be such that the bar break information is calculated based on the beat position information that is stored in the beat address table 30 or the beat time information table 30 and the musical tone data beat information (for example, such as 4/4 beats and the like) and the processing is carried out in bar units based on the bar break information. As described above, by means of carrying out the reproduction or the saving of the musical tone data in bar units, which are greater than beat units, since it is possible to do the reproduction or the saving in units that are musically consistent, it is convenient from the standpoint of carrying out the work involved, in addition, in the electronic musical instrument 1, the configuration may be such that either processing with beat units, which are small units, or processing with bar units can be employed or it may also be configured such that both kinds of processing are used in parallel, and the configuration may be such that the processing of the two is switched as desired.

In addition, in the preferred embodiments described above, the start address and the stop address have been set based on the address that is stored in the beat address table 30. In particular, the start address is set (S106, S114) based on the address that is stored in the beat address table 30 and the stop address is set to the address which is the address that is stored in the beat address table minus α (α is 1 in the preferred embodiment). In contrast to this, it may be set up such that the stop address is set based on the address that is stored in the beat address table 30 and the start address may be set to the address which is the address that is stored in the beat address table plus β (β may be, for example, 1). In addition, it may also be set up such that the start address is set to the address of the portion that goes from silence to having sound that is immediately adjacent to the address that is stored in the beat address table 30 and the address of the portion that goes from having sound to silence that is immediately adjacent to the address that is stored in the beat address table 30 is set as the stop address.

In addition, both the start address and the stop address are set based on the address that is stored in the beat address table 30. However, instead of this, it may be set up such that only either the start address or the stop address is set based on the address that is stored in the beat address table 30, and the other address is derived from the sampling frequency and the tempo value.

In addition, in the preferred embodiments described above the configuration is such that the beat position information is added by the storage of the lead address of each beat of the musical tone data in the beat address table 30 in conformance with the tempo. However, it may also be configured such that the beat position information that has been added in accordance with the preferred embodiments described above can be freely revised (changed). In other words, it may be set up such that the lead address for each beat is altered based on the starting point of the musical tone data, the number of samples for the amount of one beat that is calculated from the BPM (beat per minute) information that has been set by the user, and the sampling frequency. For example, rather than an automatic performance in conformance with the tempo that has been set based on the operation of the tempo knob 88, it may also be set up such that the BPM information is added that corresponds to the tempo in which an operator such as a tap button and the like has been operated by the user him or herself and, based on the BPM information and the sampling frequency, the beat position information is revised and added. According to this embodiment, it would be possible to add the beat position information that corresponds to a newly specified tempo even for musical tone data that have been performed and recorded at a tempo that conforms to the sensations of the performer. Also, it may be set up such that the starting point of the musical tone data is set to the point at which the input level at the time of recording exceeds a specified threshold, or it may also be set up such that it is possible for the user to instruct the start as desired.

In addition, in the preferred embodiments described above, the saving of the musical tone data is carried out by means of the operation of the save button 83. However, instead of this, it may be set up such that in those cases where a state (a specified state) is detected in which the amplitude value of the musical tone data is at a specified value or less and, moreover, that condition continues for a specified period of time, the address at which the amplitude value had become the specified value or less is set as the stop address and the address at which the amplitude value of the musical tone data after a specified state that is immediately prior to the specified state that has been detected becomes a specified value or above is set as the start address. In addition, it may also be set up such that the musical tone data that are between the start address and the stop address are automatically saved.

In addition, in the preferred embodiments described above, the configuration is such that in the storage mode of the electronic musical instrument 1, the storage address that corresponds to the beginning position of each beat of the musical tone data that are stored in the ring buffer is stored in the beat address table 30. It may be set up such that there are cases in which the storage addresses that are stored in the memory (the RAM 4) are shifted due to optimization of the memory and the like; and, in those cases, the storage addresses that are stored in the beat address table 30 are updated in conformance with the shift.

In addition, in the preferred embodiments described above, the musical tone data that have been stored in the ring buffer are saved to a saving region in the RAM 4, but embodiments may also include a storage medium such as a hard disk and the like in the electronic musical instrument 1 for saving the musical tone data. In addition, in the preferred embodiments described above, the musical tones from a device that is connected to the input terminal are made the subjects of the sampling but the sampling may also be done of musical tones that are generated by the musical tone generator 9 in accordance with the keyboard 7 performance. In addition, those musical tones may be mixed and sampled together with the musical tones that are input through the input terminal. In addition, in the preferred embodiments described above, the musical tone data have been stored to a ring buffer but embodiments may also provide that the performance data that have been input externally and the performance data that have been performed on the keyboard 7 are stored to the ring buffer in the same manner as the musical tone data and the reproduction and saving done in beat or bar units.

In addition, in the preferred embodiments described above, the configuration is such that the start point cursor 90b, the end point cursor 90c, and the grid lines 90d can be displayed or shifted in beat units. Instead of this, embodiments to may provide that it is possible for the display or shifting to be in bar units, which are units that are larger than beats. Since by making the breaks of the musical tone data bar units rather than beat units it is possible for the display or the shift to be in units that are musically consistent, this is convenient from the standpoint of editing work.

Furthermore, embodiments may also provide that the display or shifting of the start point cursor 90b, the end point cursor 90c, and the grid lines 90d can be carried out with the beat units and the bar units used together. In this case, for example, if the grid lines 90 that indicate the beat position and the grid lines 90d that indicate the bar break position are displayed in states (for example, size) that are different, the beat position and the bar position can both be easily recognized. In addition, with regard to the start point cursor 90b and the end point cursor 90c also, in embodiments where the operation in which the shifting is in beat units and the operation in which the shifting is in bar units are carried out as separate operations, a small shift in beat units as well as a large shift in bar units both become possible, and it is convenient from-n the standpoint of operation. In the preferred embodiments described above, in the case where the shifting of each of the point cursors 90b and 90c is done in beat units, the address change button 82 is operated. Here, embodiments may also include that in order for the shifting of each of the point cursors 90b and 90c to be done in bar units, a separate shift button is provided and the address change button 82 is operated together with the shift button.

In addition, in the preferred embodiments described above, the beat position information (or bar break position information) is added for the musical tone data that have been recorded. Here, various kinds of applications can be proposed by means of the use of the beat position information (or the bar break information) that is added based on the preferred embodiments described above. For example, one set of data can be broken at beat positions (or bar break positions) based on the beat position information (or the bar position information) and divided into a plurality of sets of musical tone data, and the sets of musical tone data that have been divided can each be assigned to the individual pads that comprise the pads 92. Then, when the pads 92 to which each of the sets of musical tone data has been assigned are operated in the order that is desired by the user, it is possible to perform the original musical tone data in the desired order in beat units (or bar units). In other words, a new musical composition can be easily produced based on the existing musical tone data.

In addition, based on the preferred embodiments described above, by means of the use of the beat position information (or the bar break position information) that has been added, the musical tone data can be easily used as sequence track data. In other words, the musical tone data that are appended to sequence tracks in beat units (or bar units) can be easily synchronized and reproduced with the automatic performance data that are recorded to a separate track.

While particular embodiments of the present invention have been shown and described, it will be obvious to those skilled in the art that the invention is not limited to the particular embodiments shown and described and that changes and modifications may be made without departing from the spirit and scope of the appended claims.

What is claimed is:

1. An electronic musical instrument comprising:
input means for inputting musical tones;
musical tone storage means for storing sequentially at a specified sampling period the musical tones that have been input by the input means;
selectable tempo setting means for selectively changing and setting a tempo of successive time instances for a sequence of stored musical tones, each time instance having a time instance number;
time information storage means for storing time information that defines a plurality of succeeding times after a starting time, wherein each of said times after the starting time is associated with a time instance number for the sequence of musical tones stored in the musical tone storage means; and
readout start means for readout of the musical tones stored in the musical tone storage means based on the time information stored in the time information storage means.

2. The electronic musical instrument of claim 1, wherein the readout start means includes storage address acquisition means for acquiring a storage address that corresponds to the time information of the musical tones based on the time information stored in the time information storage means and the sampling period, wherein the readout of the musical tones that have been stored in the musical tone storage means is started based on the storage address acquired by the storage address acquisition means.

3. The electronic musical instrument of claim 2, further comprising instruction means for instructing acquisition of the storage address by the storage address acquisition means, and wherein the storage address acquisition means acquires the storage address that corresponds to the time information for the musical tones when the instruction means instructs acquisition of the storage address based on instruction time information acquired in conformance with a timing of the instruction, the storage address that corresponds to the instruction time information, the time information stored in the time information storage means, and the sampling period.

4. The electronic musical instrument cited in claim 3 further comprising a saving means for saving, in units based on the storage address acquired by the storage address acquisition means, the musical tones that are stored in the musical tone storage means.

5. The electronic musical instrument of claim 2, further comprising a saving means for saving, in units based on the storage address acquired by the storage address acquisition means, the musical tones that are stored in the musical tone storage means.

6. The electronic musical instrument of claim 1, further comprising:

waveform display means for displaying waveforms of the musical tones input by the input means; and timing display for displaying, at a position that corresponds to the timing that conforms to the tempo that has been set in the tempo setting means, the waveforms of the musical tones displayed by the waveform display means.

7. The electronic musical instrument cited of claim 1, wherein each time instance that corresponds to the tempo that has been set by the tempo setting means is a beat.

8. The electronic musical instrument of claim 1, wherein each time instance that corresponds to the tempo that has been set by the tempo setting means is a bar.

9. The electronic musical instrument of claim 1, further comprising reporting means for reporting the timing that corresponds to the tempo that has been set by the tempo setting means.

10. The electronic musical instrument of claim 1, wherein tempo comprises a beat tempo and wherein the time information storage means comprises storage means for storing data corresponding to a plurality of times and a corresponding plurality of beat numbers, wherein each respective one of the times is associated with a respective, corresponding beat number.

11. The electronic musical instrument of claim 10, wherein the plurality of times comprises a plurality of absolute times that are measured from a time at which power is applied to the electronic musical instrument.

12. An electronic musical instrument comprising:
input means for inputting musical tones;
musical tone storage means for sequentially storing at a specified sampling period the musical tones that have been input by the input means;
selectable tempo setting means for selectively changing and setting a tempo of timing for a sequence of stored musical tones, the tempo defining a plurality of successive time instances, each respective successive time instance corresponding to a respective different time instance number;
address information storage means for storing address information that defines a plurality of addresses corresponding to storage locations of the musical tones in the musical tone storage means, wherein each of said addresses is associated with a time instance number of the tempo set by the selectable tempo setting means; and
readout start means for readout of the musical tones stored in the musical tone storage means based on the address stored in the address storage means at a tempo set by the selectable tempo setting means.

13. The electronic musical instrument of claim 12, further comprising saving means for saving, in units based on the storage address stored in the address information storage means, the musical tones stored in the musical tone storage means.

14. The electronic musical instrument of claim 12, further comprising:
waveform display means for displaying waveforms of the musical tones input by the input means; and
timing display for displaying, at a position that corresponds to the timing that conforms to the tempo that has been set in the tempo setting means, the waveforms of the musical tones displayed by the waveform display means.

15. The electronic musical instrument cited of claim 12, wherein each time instance that corresponds to the tempo that has been set by the tempo setting means is a beat.

16. The electronic musical instrument of claim 12, wherein each time instance that corresponds to the tempo that has been set by the tempo setting means is a bar.

17. The electronic musical instrument of claim 12, further comprising
reporting means for reporting the timing that corresponds to the tempo that has been set by the tempo setting means.

18. The electronic musical instrument of claim 17, wherein the reporting means reads performance data and automatically performs in conformance with the tempo that is set by the tempo setting means.

19. The electronic musical instrument of claim 12, wherein tempo comprises a beat tempo and wherein the address information storage means comprises storage means for storing data corresponding to a plurality of addresses and a corresponding plurality of beat numbers, wherein each respective one of the addresses is associated with a respective, corresponding beat number.

20. An electronic musical instrument comprising:
a tempo controller for recording a tempo defining a plurality of successive time instances, wherein each time instance is associated with a time instance number;
an input device for accepting a sequence of musical note data;
a storage device for storing the sequence of musical note data and for storing time information that defines a plurality of succeeding times after a starting time, wherein each of said times after the starting time is associated with a time instance number for timing musical note data stored in the storage device; and a processor for writing the sequence of musical note data to the storage device, reading the sequence of musical note data from the storage device, and processing the sequence of musical note data, wherein the processor processes the sequence of musical note data stored in the storage device at a timing consistent with the tempo recorded by the tempo controller.

21. The electronic musical instrument of claim 20, wherein the processor correlates an address of the storage device containing the musical note data with the timing consistent with the tempo.

22. The electronic musical instrument of claim 21, further comprising an adjuster for adjusting a time between a beginning of the sequence of musical note data and an end of the sequence of musical note data.

23. The electronic musical instrument of claim 22, wherein the processor correlates an address of a beginning of an adjusted sequence of musical note data with the timing consistent with the tempo.

24. The electronic musical instrument of claim 22, wherein the adjuster shortens the time between the beginning of the sequence of musical note data and the end of the sequence of musical note data.

25. The electronic musical instrument of claim 22, wherein the adjuster lengthens the time between the beginning of the sequence of musical note data and the end of the sequence of musical note data.

26. The electronic musical instrument of claim 20, further comprising a tone generator for converting the sequence of musical note data into musical tones.

27. The electronic musical instrument of claim 20, wherein each time instance that corresponds to the tempo that has been set by the tempo setting means is a bar.

28. The electronic musical instrument of claim 20, wherein each time instance that corresponds to the tempo that has been set by the tempo setting means is a beat.

29. The electronic musical instrument of claim 20, wherein the input device is a keyboard.

30. The electronic musical instrument of claim 20, wherein the selectable tempo comprises a selectable beat tempo and wherein the storage device further stores data corresponding to a plurality of times and a corresponding plurality of beat numbers, wherein each respective one of the times is associated with a respective, corresponding beat number; and wherein the processor processes the sequence of musical note data by processing musical note data for each beat at a timing consistent with the time associated with the beat number in the storage device.

31. The electronic musical instrument of claim 20, wherein the selectable tempo comprises a selectable beat tempo and wherein the storage device further stores data corresponding to a plurality of addresses and a corresponding plurality of beat numbers, wherein each respective one of the addresses is associated with a respective, corresponding beat number; and wherein processing the sequence of musical note data comprises, for each beat, processing musical note data at the address corresponding to a beat number associated with the beat.

32. A method of processing a sequence of musical note data comprising:

accepting the sequence of musical note data;

writing the sequence of musical note data to the storage device;

selecting and recording a selectable tempo of successive time instances for a sequence of stored musical tones, each time instance having a time instance number;

storing time information that defines a plurality of succeeding times after a starting time, wherein each of said times after the starting time is associated with a time instance number for the sequence of musical tone data stored in the storage device;

reading the sequence of musical note data from the storage device; and processing the sequence of musical note data at a timing corresponding to the times associated with the time instance numbers, wherein the sequence of musical note data stored in the storage device is processed at a timing consistent with the tempo.

33. The method of claim 32, wherein an address of the storage device containing the musical noted data is correlated with the timing consistent with the tempo.

34. The method of claim 33, further comprising adjusting a time between a beginning of the sequence of musical note data and an end of the sequence of musical note data.

35. The method of claim 34, wherein the time between the beginning of the sequence of musical note data and the end of the sequence of musical note data is shortened.

36. The method of claim 34, wherein the time between the beginning of the sequence of musical note data and the end of the sequence of musical note data is lengthened.

37. The method of claim 34, wherein an address of a beginning of an adjusted sequence of musical note data is correlated with the timing consistent with the tempo.

38. The method of claim 32, further comprising converting the sequence of musical note data into musical tones.

39. The method of claim 32, wherein each time instance that corresponds to the tempo is a bar.

40. The method of claim 32, wherein each time instance that corresponds to the tempo is a beat.

41. The method of claim 32, wherein the input device is a keyboard.

42. The electronic musical instrument of claim 32, wherein the selectable tempo comprises a selectable beat tempo and wherein the method further comprises storing data corresponding to a plurality of times and a corresponding plurality of beat numbers, wherein each respective one of the times is associated with a respective, corresponding beat number; and wherein processing the sequence of musical note data comprises processing musical note data for each beat at a timing consistent with the time associated with the beat number in the storage device.

43. The electronic musical instrument of claim 32, wherein the selectable tempo comprises a selectable beat tempo and wherein the method further comprises storing data corresponding to a plurality of addresses and a corresponding plurality of beat numbers, wherein each respective one of the addresses is associated with a respective, corresponding beat number; and wherein processing the sequence of musical note data comprises, for each beat, processing musical note data at the address corresponding to a beat number associated with the beat.

44. An electronic musical instrument comprising:

means for accepting the sequence of musical note data;

means for writing the sequence of musical note data to the storage device;

means for selecting and recording a selectable tempo of successive time instances for a sequence of stored musical tones, each time instance having a time instance number;

means for storing time information that defines a plurality of succeeding times after a starting time, wherein each of said times after the starting time is associated with a time instance number for the sequence of musical tone data stored in the storage device;

means for reading the sequence of musical note data from the storage device; and means for processing the sequence of musical note data at a timing corresponding to the times associated with the time instance numbers, wherein the sequence of musical note data stored in the storage device is processed at a timing consistent with the tempo.

45. The electronic musical instrument of claim 44, wherein tempo comprises a beat tempo, each of said time instances comprises a beat and said time instance numbers comprise beat numbers.

46. The electronic musical instrument of claim 45, wherein the plurality of succeeding times after a starting time comprises a plurality of absolute times that are measured from a time at which power is applied to the electronic musical instrument.

47. The electronic musical instrument of claim 44, wherein the selectable tempo comprises a selectable beat tempo, each of said time instances comprises a beat and said time instance numbers comprise beat numbers; and wherein the means for processing processes the sequence of musical note data by processing musical note data for each beat at a timing consistent with the time associated with the beat number in the storage device.

48. The electronic musical instrument of claim 44, wherein the selectable tempo comprises a selectable bar tempo, each of said time instances comprises a bar and said time instance numbers comprise bar numbers; and wherein the means for processing processes the sequence of musical note data by processing musical note data for each bar at a timing consistent with the time associated with the bar number in the storage device.

* * * * *